(No Model.)

R. S. BRIDGMAN.
CHURN DASHER.

No. 252,995.                    Patented Jan. 31, 1882.

WITNESSES:
W. W. Hollingsworth
W. Read

INVENTOR:
R. S. Bridgman
BY
ATTORNEYS.

UNITED STATES PATENT OFFICE.

ROBERT S. BRIDGMAN, OF CHARLESTON, ARKANSAS.

CHURN-DASHER.

SPECIFICATION forming part of Letters Patent No. 252,995, dated January 31, 1882.

Application filed November 3, 1881. (No model.)

*To all whom it may concern:*

Be it known that I, ROBERT SHARPE BRIDGMAN, of Charleston, in the county of Franklin and State of Arkansas, have invented a new and useful Improvement in Churn-Dashers; and I do hereby declare that the following is a full, clear, and exact description of the same, reference being had to the accompanying drawings, forming part of this specification, in which—

Figure 1:
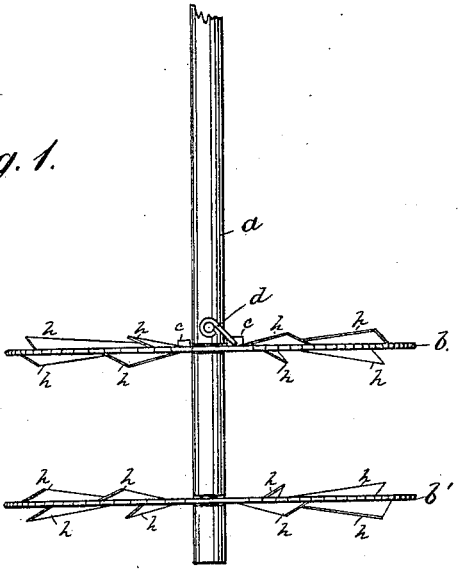
Figure 2:
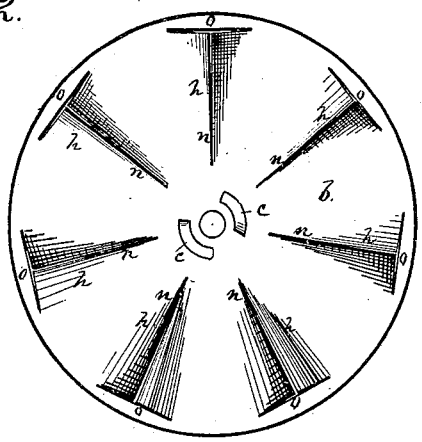

Figure 1 is an elevation of improved dasher, and Fig. 2 is a plan of the upper disk.

My invention relates to improvements in churn-dashers; and it consists in the peculiar construction and arrangement of the parts, as hereinafter more fully set forth.

In the accompanying drawings, $a$ represents a dasher-shaft formed in three or more sections, detachably connected together by screw-fastenings, to which, near its lower end, are journaled the parallel, horizontal, circular dashers $b\ b'$, which are free to revolve on the dasher-shaft and are detachably connected therewith, so that the dashers may be removed from the dasher-shaft for cleaning or other purposes, when desired, and replaced. The dasher $b$ is formed by first drawing a series of radial lines, $n$, from near the center of the dasher to near its circumference, at equal distances apart. At the outer extremity of each radial line $n$ a chord, $o$, is drawn at right angles to the radial line, and each blade $h$ of the dasher thus formed has one edge bent upwardly and its opposite edge bent downwardly, so that in the downward movement of the dasher in the milk it will be revolved in one direction, and in the upward movement of the dasher it will be revolved in an opposite direction. The lower dasher, $b'$, is of the same construction as the dasher $b$, excepting that the bends in the radial edges of the blades are reversed or bent in an opposite direction. By this construction, in the reciprocating movement of the dasher-shaft the dashers revolve in opposite directions, stirring the milk violently, with counter-currents from top to bottom.

$c$ represents two or more stop-catches, or a circular ratchet-plate, secured to the upper face of the dasher $b$ near its center.

$d$ represents a pawl, pivoted to the dasher-shaft near the dasher $b$, and adapted to engage with the teeth of the ratchet. In the downward movement of the dasher $b$ the pawl will ride over the ratchet-teeth, while in the upward movement of the dasher the pawl will engage with one of the ratchet-teeth and prevent the dasher $b$ from revolving in its upward movement. The ratchet and pawl are to be used in gathering the butter after the milk has been churned sufficiently. By the employment of the ratchet and pawl the dasher is free to revolve in its downward movement, but its rotary motion is stopped at once in its upward movement. The pawl must be turned up out of the way when the dasher is used in churning, to allow the free action of the dashers, and is only turned down when the milk is churned and it is desired to gather the butter.

I claim as my invention—

The combination, with the dasher-shaft $a$, provided with the pawl $d$, pivoted thereto, of the dasher $b$, journaled on the shaft and constructed as set forth, and provided with the ratchet-plate $c$, whereby, when the pawl is raised, the dasher will be revolved in the reciprocations of its shaft, and when the pawl is lowered the dasher will be locked in its upward movement to gather the butter, substantially as described.

ROBERT SHARPE BRIDGMAN.

Witnesses:
CHARLES KNOBLE,
SAM. YONGER.